United States Patent [19]

Reuter

[11] Patent Number: 4,849,580
[45] Date of Patent: Jul. 18, 1989

[54] ENVIRONMENTAL PROTECTION CLOSURE FOR WIRE SPLICES; AND METHOD

[75] Inventor: Donald F. Reuter, Bloomington, Minn.

[73] Assignee: Minnesota Mining and Manufacturing Company, St. Paul, Minn.

[21] Appl. No.: 154,934

[22] Filed: Feb. 11, 1988

[51] Int. Cl.⁴ .................... H02G 15/113; H01R 43/00
[52] U.S. Cl. ........................................ 174/92; 156/49; 174/76; 439/521
[58] Field of Search ............. 174/92, 76, 84 R, 138 F; 439/521; 156/49

[56] References Cited

U.S. PATENT DOCUMENTS

| | | | |
|---|---|---|---|
| 3,183,302 | 5/1965 | Wochner et al. | 174/92 |
| 3,519,731 | 7/1970 | Grunbaum | 174/92 |
| 4,157,208 | 6/1979 | Roberts et al. | 439/204 |
| 4,392,014 | 7/1983 | Trumble et al. | 174/72 |
| 4,451,696 | 5/1984 | Beinhaur | 174/92 |
| 4,504,699 | 3/1985 | Dones et al. | 174/76 X |
| 4,600,959 | 7/1986 | Hendrickson | 361/395 |
| 4,610,738 | 9/1976 | Jervis | 174/76 X |
| 4,645,285 | 2/1987 | Cozzens et al. | 439/395 |
| 4,647,717 | 3/1987 | Uken | 174/76 X |
| 4,662,692 | 5/1987 | Uken et al. | 439/426 |
| 4,714,801 | 12/1987 | Koblitz et al. | 174/84 C X |
| 4,718,678 | 1/1988 | Vansant | 174/77 R |
| 4,721,832 | 1/1988 | Toy | 174/76 X |
| 4,736,071 | 4/1988 | Hawkins et al. | 174/92 |

FOREIGN PATENT DOCUMENTS 1374201  8/1964  France .................................. 174/92

OTHER PUBLICATIONS

Waterproof Wire Connector; Gel-Tite (TM); GardenAmerica Corporation.
Scotchbrand Electrical Moisture Sealant Pad 09092; 3M publication.
Standard Test Methods for Cone Penetration of Lubricating Grease; ASTM Designation: D217-82.

Primary Examiner—Morris H. Nimmo
Attorney, Agent, or Firm—Merchant, Gould, Smith, Edell, Welter & Schmidt

[57] ABSTRACT

An environmental closure and method are provided, for use in generating an environmental seal about wire splices or the like. The preferred closure comprises a unitary construction having an outer, openable, shell with an internal biasing mechanism. In use, viscous sealant material is positioned within the closure such that the biasing mechanism generally forces sealant material around a junction to be sealed and, in particular, between adjacent wires in such junctions. In one application relatively highly viscous sealant material is utilized in association with junctions in a manner according to the present invention. In another general application, a relatively low viscosity sealant is used; the low viscosity sealant being generally bordered by high viscosity sealant, to inhibit leakage outwardly from a closure during use.

26 Claims, 3 Drawing Sheets

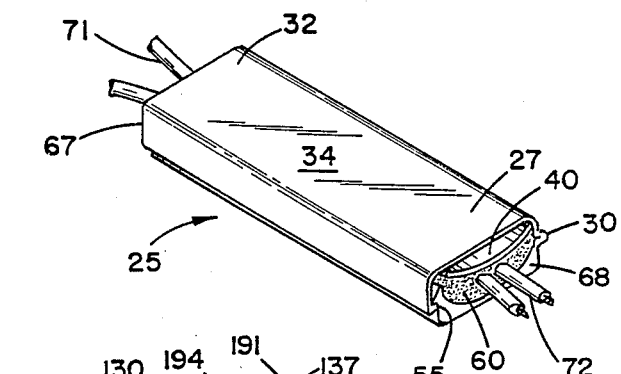
FIG. 5
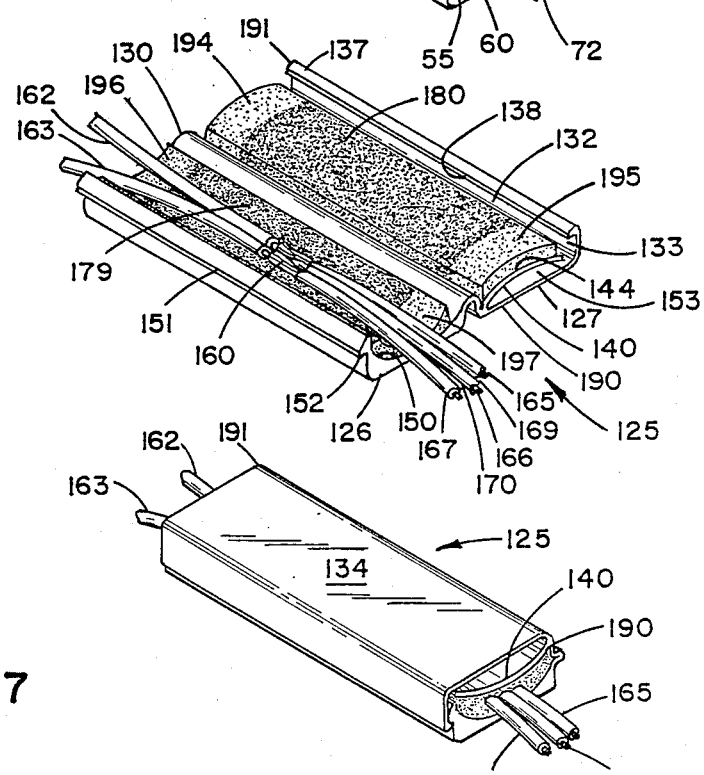
FIG. 6
FIG. 7
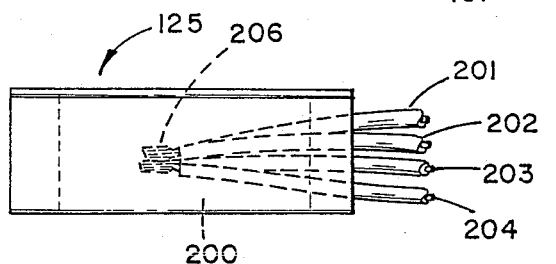
FIG. 8

ENVIRONMENTAL PROTECTION CLOSURE FOR WIRE SPLICES; AND METHOD

FIELD OF THE INVENTION

The present invention relates to environmental seals for electrical connections. The invention particularly concerns closures which may be placed around an electrical connection, in a manner generating an effective, water-resistant, environmental seal.

BACKGROUND OF THE INVENTION

Junctions or splices involving electrical wiring generally should be sealed for protection against exposure to the elements, particularly moisture: for inhibition of deterioration from corrosion; to reduce the likelihood of electrical shorts or the like; and, to otherwise enhance performance of the electrical system of concern. Generally, such junctions involve at least two, and often a large number, of insulated wires brought together, and exposed, at a particular junction. The junctions may be of a variety of types, including: connections having wires brought together from opposite directions, or a plurality of directions; and, pig-tail connections wherein the wires are generally directed toward the site of the connection from a single direction. Generally, maintenance of secure, conductive, connection at the point or points of engagement is facilitated through use of mechanical means such as by clamping and/or with use of welds or points of soldering.

As previously indicated, generally the connection involves exposure of conductive wire portions, from a plurality of extensions of insulated wire. The exposed portions, after the connection is made, should be protected from the environment, especially from moisture. Numerous seals and seal methods for accommodating this have been developed. They include: wrapping the connection in insulating tape; molding a protective plug around the connection; sealing the connection with a heat shrink tubing/adhesive arrangement; and, sealing the connection within or between sheets or layers of material.

Assembled devices such as automobiles, trucks, construction equipment, marine vehicles, mobile homes, generators, pump systems, construction machinery or the like may include a great many wire splices therein, each of which is environmentally sealed during assembly or manufacture. Generally, through the lifetime of such devices, it may be necessary for maintenance and repair persons, mechanics, etc. to gain access to sealed splices. Typically, to accomplish this, the worker removes factory-installed environmental seals, to work on the junction. After the maintenance process, generally the environmental seal must be replaced.

Many factory-installed environmental seals cannot be easily reinstalled, once removed. That is, generally the removal process involves the destruction of the seal. Thus, the maintenance person is in a position of having to install a new environmental seal about the electrical junction.

Since the junction is, at the point of maintenance, typically positioned within a fully- or nearly fully- assembled vehicle, piece of machinery or the like, the junction sometimes cannot be readily sealed via factory techniques, which may involve complex or large assembly equipment and which may require access to a significantly disassembled unit. That is, often the junction is located in a difficult to access area. This can be a particular problem if significant equipment is needed to effect the junction. Further, the mechanic may not have the special tools needed to re-effect factory seals.

As a result, the maintenance person generally must install any environmental seal, to be applied, by hand or with hand tools. In the past, this has typically been done either by wrapping the junction in insulating tape or the like, or enclosing the junction within some form of seal-closure or casing.

It is noted that there are many other instances in which exposed electrical components need to be environmentally protected. For example, a splice might be created in the field. For these situations, problems analogous to those discussed for factory-created splices have occurred.

Electrical tape, while it provides fairly good electrical insulation, does not provide a particularly desirable environmental seal. A reason for this is that if tape is used on two or more substantially adjacent wires, the tape provides for no significant sealing in the area between the wires. That is, moisture or the like can invade the area of the junction, by passage between adjacent wires.

Closure casing arrangements have been somewhat more successful; however, conventional arrangements have not been fully acceptable, for a variety of reasons including those relating to the following.

The closure should be such as to facilitate easy application, even in hard to reach locations. Some conventional arrangements have been relatively complex multi-component or multi-piece arrangements. These may be subject to problems of handling, during installation. Further, they may be difficult to orient properly, in use.

Secondly, many arrangements have not provided a desirable seal between adjacent wires, when used with multi-wire arrangement. That is, some conventional arrangements have worked fairly well when utilized on relatively small junctions, for example those formed from two oppositely directed wires. However, with more complicated arrangements, conventional devices have not provided very good seals between substantially adjacent wires.

Further, conventional arrangements have, on the whole, not handled multi-wire pigtail arrangements very well. A major problem relating to this is the same as above-described. That is, sealing with respect to substantially adjacent wires has not been well-effected.

It is also desirable that the closure be such as can be relatively easily installed on the wire, and retained in place. Further, a relatively simple construction is desirable, as it can be easily manufactured and will be relatively inexpensive to prepare and use. Also, a relatively universal construction, which can be used on a variety of types and sizes of junctions would be preferred, for convenience. Many conventional arrangements have required relatively complicated structures, which do not lend themselves well to inexpensive manufacture or simplicity of use.

What has been needed has been an environmental protection enclosure for electrical junctions or the like, a preferred form of which addresses the above concerns. In addition, a method for providing an effective replacement environmental seal about an electrical junction or the like, has been needed. What has been particularly needed has been a preferred arrangement and method well adapted for providing a good environmental seal about a multi-wire arrangement, involving a plurality of substantially parallel, or substantially adjacent, wires.

SUMMARY OF THE INVENTION

According to the present invention a shell or closure construction or assembly is provided to facilitate provision of an environmental seal about a multi-wire splice or junction. It is noted that the device can also be used to provide effective sealing around other types of exposed electrical conductants or components, by operation in a manner analogous to that described. The enclosure comprises first and second sections, covers or shells which, when mated to one another in a preferred manner, operate to form an internal component or junction-receiving chamber having open ends, to conveniently enclose a selected component and/or junction. An environmental seal is provided by means of a sealing material received within the enclosure, in a preferred manner, on and between the two sections. The preferred closure is provided with an internal biasing means, which operates to facilitate provision of pressure against the sealant in the sealed, enclosed, junction. Pressure from the biasing means generally operates: to force sealant between adjacent wires, to generate a good environmental seal therebetween; and, in preferred embodiments, to provide opposite pressure to means clasping or latching the closure shut, to help maintain closure. Generally, the biasing means acts in a manner directing pressure between opposed internal surfaces in the shell. The sealant material, discussed in greater detail below, is preferably a substance which flows under pressure between the enclosure sections, to achieve spreading or positioning completely around a junction or the like. Generally, a relatively viscous sealant is used, since it will otherwise substantially leak outwardly from ends or the closure.

The preferred embodiment comprises a closure of unitary construction, having a hinge between the first and second closure sections or shells. Preferably the hinge is an integral or living hinge; i.e., it is formed within the structure. A convex spring plate, preferably provided within one of the closure sections, operates as the biasing means and selectively provides for pressure against an enclosed sealant-engulfed junction. With multi-wire splices or components, and sealant of appropriate viscosity, pressure induced by the spring plate facilitates flow of viscous sealant between adjacent wires.

In preferred embodiments the spring plate is formed integral with the overall closure structure. This avoids a loose, possibly hard to assemble, arrangement from which parts could easily be lost. Also, it ensures proper orientation of the spring plate relative to the remainder of the assembly.

Further, the closure assembly is preferably provided with latch or clasp means associated therewith to retain the sections biased toward one another, when the assembly is placed in use. This prevents the assembly from inadvertently becoming disassociated with a splice, during use. Preferably, the latch means comprises a mechanism formed integral with the closure structure, for convenience.

A variety of methods may be utilized to manufacture closures having the described characteristics. For example, a closure having the above described integral features may conveniently be manufactured by conventional extrusion methods. This is advantageous, since the advantageous features described can be readily provided in an inexpensive and mass manufactured arrangement.

Preferably, the section not having the convex plate thereon, has a substantially matching concave surface therein. That is, the concave surface is elongate, longitudinal, and extends substantially parallel to the convex plate. Preferably, the curvature of the concave surface is slightly greater than that of the convex member. In use, a junction to be sealed is engulfed within viscous sealant positioned between the concave surface of one section, and the biasing plate of the other section.

The closure is generally used in combination with a sealant. The viscous sealant typically comprises a material usable to form a good environmental seal. In one embodiment, a thick pad of viscous sealant is provided on the biasing plate, and a second thick pad is provided on the concave surface of the closure. In use, the junction is positioned on the viscous sealant, and the closure is folded therearound. A relatively high viscosity sealant, under such circumstances, will tend to be forced into areas between adjacent wires, but due to its viscosity it will not substantially flow outwardly from the closure. Viscous sealant material usable for this is described in further detail below. An alternate manner of identifying sealant usable according to the present invention, rather than by viscosity directly, is by cone penetration value. If the cone penetration value is relatively low, the material is thick and viscous. Cone penetration values are measured according to the procedures outlined in ASTM D217-82 (IP Designation 50/69(79) incorporated herein by reference.

In some applications, a significant number of adjacent wires, for example three or more, may be involved. For such arrangements, flow of highly viscous, or low cone penetration value, sealant into areas between adjacent wires may be difficult to effect without relatively high pressures. To accommodate this, a multi-sealant system may be used. In particular, a relatively low viscosity, i.e. high cone penetration value, sealant would be used in a central portion of the enclosure. Under pressure preferably provided by the biasing plate, a relatively low viscosity sealant can be readily forced into areas between even a relatively large number of adjacent wires. Thus, a good seal against moisture migrating toward the junction between adjacent wires, is readily provided.

With this latter described application involving a relatively low viscosity sealant, a second field or area of sealant is preferably provided. The second area of sealant preferably comprises a relatively high viscosity sealant, which is not subject to substantial ease of flow under the conditions of use. The relatively high viscosity sealant is preferably provided as a retaining border and seal around at least certain outer edges of the low viscosity sealant. The high viscosity sealant tends, as described below, to retain the low viscosity sealant within the structure. That is, the high viscosity sealant acts to seal otherwise open ends of the closure, and to prevent flow of low viscosity sealant outwardly therefrom.

It is foreseen that some advantages could be obtained from use of a combination involving multiple sealant viscosities of sealant material even in the absence of a biasing plate. Under such circumstances, the junction being sealed would simply be pressed between sealant fields on each shell section. Generally, the internal biasing plate will lend advantage as it helps direct preferred internal sealant flow.

According to the present invention, methods are also provided for generating an environmental seal about a junction. According to a first method, a seal is provided by means of a closure generally as above described, with a field of relatively high viscosity sealant therein. In a second method, a multi-sealant field is used, generally to provide relatively high viscosity sealant material around certain outer edges, and relatively low viscosity sealant in a central portion. Application of these methods will be better understood from the detailed descriptions below.

The drawings constitute a part of this specification, and include exemplary embodiments of the present invention, while illustrating various objects and features thereof. It will be understood that in some instances relative material thicknesses, and relative component sizes, may be shown exaggerated, to facilitate an understanding of the invention.

BRIEF DESCRIPTION OF THE DRAWINGS

FIG. 5 is a fragmentary perspective view of the arrangement shown in FIG. 4, but with the closure illustrated in a closed orientation, to form an environmental seal about an engaged electrical junction.

FIG. 6 is a fragmentary perspective view of an alternate application of a closure according to the present invention; generally analogous to FIG. 4 but showing fields of viscous sealant having sections of different viscosities.

FIG. 7 is a fragmentary perspective view of the arrangement shown in FIG. 6, oriented with a closure in a closed orientation to form an environmental seal about an electrical junction.

FIG. 8 is a fragmentary top plan view of a closure according to the present invention, shown providing an environmental seal about a pig-tail splice involving four substantially adjacent wires; phantom lines generally indicating portions hidden from view.

DETAILED DESCRIPTION OF THE INVENTION

The present invention generally concerns a closure or clamshell arrangement of a preferred structure, for providing an environmental seal around electrical junctions, electrical components or the like. While the closure may be used to enclose a variety of arrangements to be protected, it is generally described with respect to splices, a foreseen common application. Two general embodiments are described herein. The major embodiments differ generally by the arrangement of viscous sealant within the closure, during use, in differing manners. In particular, according to a first application, only one form of relatively highly viscous sealant is used in an interior of the closure, to provide for the environmental seal. In a second embodiment, a preferred multi-sealant arrangement is provided, having sections of sealant of different viscosities. Both embodiments have advantages, in certain applications. An optional sealing tongue, usable with either embodiment is also described. Initially, detailed descriptions are provided concerning the closure construction and physical arrangement of sealant(s) for the two embodiments. An alternate embodiment including an optional sealing tongue is also described. Following these descriptions, details concerning usable sealant(s) are provided.

The Embodiment of FIGS. 1-5

Figure 1:
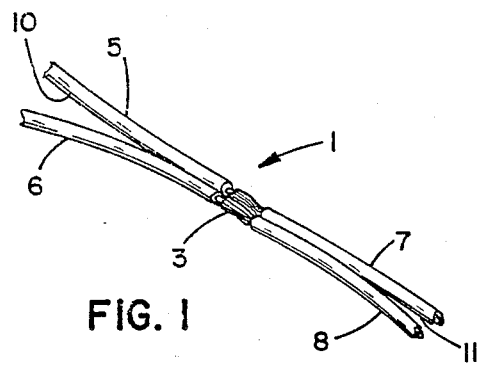
FIG. 1 is a fragmentary perspective view of an electrical junction or splice, which may be sealed according to the methods of, and with devices according to, the present invention.

The reference numeral 1, FIG. 1, indicates an electrical connection or junction such as can be provided with an environmental seal, according to devices and methods of the present invention. The junction 1, of FIG. 1, is formed at a point 3 whereat four wires 5, 6, 7 and 8 are spliced to one another. It will be understood that the four wire arrangement of FIG. 1 is merely intended to be exemplary of splices or other electrical components which can be protected according to the present invention. For example, a splice involving a variety of numbers of wires, approaching connection points from various directions, may be sealed. Also, components not comprising splices could be enclosed. Generally, the splices of primary concern to the present invention involve wires which are brought into the point of connection in manners either substantially opposite to one other, or substantially adjacent to one another. This is illustrated in FIG. 1. In particular, wires 5 and 6 are brought to the junction 1 in a manner substantially adjacent to one another, i.e. substantially parallel to one another. Wires 7 and 8, on the other hand, are directed into junction 1 in a manner substantially adjacent one another, but generally opposite to the direction of wires 5 and 6. Thus, an overall elongate system is provided.

Junction point 3 involves an area of exposure of insulated wires 5, 6, 7 and 8. Secure, electrically conductive, contact between the wires at point 3 may be provided by a variety of means, including mechanical means such as with crimping or crimping devices, and/or with means such as welding or soldering.

A purpose of the present invention is to provide for an environmental seal about junction 3. A particular problem in providing environmental seals about junctions such as junction 1, is that of providing a good seal between adjacent wires; for example, in space 10 between wires 5 and 6, or in space 11, between wires 7 and 8. A manner in which this is accomplished, via the present invention, and a preferred device for accomplishing this are described in detail below with respect to FIGS. 3-5.

Figure 2:
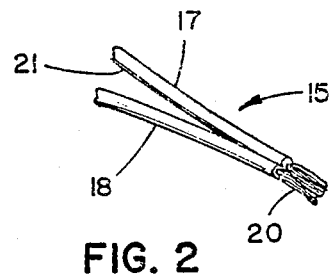
FIG. 2 is a fragmentary perspective view of a pig-tail junction or splice which may be protected according to the methods of, and with devices according to, the present invention.

Referring to FIG. 2, a pig-tail splice 15 is illustrated. In general, a pig-tail splice 15 is one which involves multiple wires, such as wires 17 and 18 directed thereto substantially adjacent one another, i.e. generally from a single direction. That is, all wires directed to a pig-tail splice 15 are substantially adjacent or parallel to one another. Pig-tail splices 15, it will be understood, also involve a point 20 of exposed conductor. It is preferred to provide an environmental seal about point 20, especially in a manner ensuring good sealing between adjacent wires, such as in space 21 between adjacent wires 17 and 18. Pig-tail splices such as splice 15 may also be accommodated according to the methods of, and with devices according to, the present invention. It will be understood that while the pig-tail splice 15 of FIG. 2 illustrated has only two wires 17 and 18 extending therein, arrangements having a different number of wires can be readily accommodated.

Figure 3:
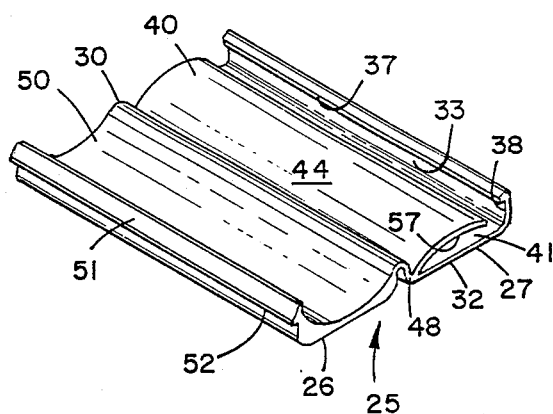
FIG. 3 is a perspective view of a closure according to the present invention depicted without a viscous sealant material in combination therewith.
Figure 4:
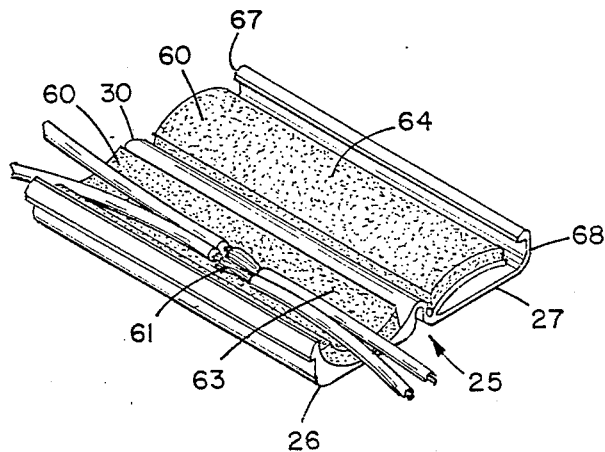
FIG. 4 is a perspective view of a closure according to the present invention, generally analogous to the view of FIG. 3; the view of FIG. 4 showing the closure in operative combination with viscous sealant material, and with an electrical junction such as that shown in FIG. 1 illustrated oriented as it could typically be during a step of forming an environmental seal with the closure.

In FIG. 3, a closure or closure arrangement 25 according to a preferred embodiment of the present invention is illustrated. In FIG. 3, closure 25 is shown as it would appear without viscous sealant positioned in operative combination or association therewith. That is, closure 25 of FIG. 3 comprises the framework or substrate only, without viscous sealant(s) which, according to the present invention, is used in association therewith, as for example is shown in FIGS. 4 and 5, to provide an environmental seal.

Referring again to FIG. 3, closure 25 comprises a first section or shell portion 26 and a second section or shell portion 27. In use, sections 26 and 27 are put into engagement with one another, to enclose a splice, component, or the like therebetween. More specifically, sections 26 and 27 generally oppose one another during use. In the preferred embodiment, sections 26 and 27 engage one another along a hinge line 30, to provide a unitary structure. Preferably hinge line 30 results from a living hinge formed in closure 25 during construction, for convenience. It will be understood that a multi-piece structure could be utilized; however in the preferred embodiment a unitary structure is illustrated, as it is relatively easy to construct and convenient to use.

Structure 25 may be formed from a variety of materials. Preferably a relatively inexpensive, easily handled, material is selected. Most preferably closure 25 is formed from a plastic, such as a polyvinyl chloride plastic or the like. In use, sealant is placed on each of sections 26 and 27, to engulf and protect an engaged junction, as described below.

Sections 26 and 27 have substantially different structures, in the preferred embodiment, with advantages resulting therefrom. Referring to FIG. 3, section 27 comprises an elongate longitudinal closure shell portion 32 defining an interior 33 and having an exterior surface 34, FIG. 5. Section 27 includes an elongate longitudinal outer edge 37, with catch, latch or clasp means comprising catch member 38, thereon. When folded about hinge line 30 in a manner to trap a junction therebetween, FIG. 5, catch member 38 is oriented to engage or clasp a corresponding portion of section 26, described below, to retain closure 25 shut.

The preferred closure 25 includes, in section 27, an internal biasing means to ensure that substantial pressure will be applied against elements trapped therein. Referring to FIG. 3, for the embodiment shown, the biasing means comprises a biasing plate or spring plate 40. The preferred spring plate 40 comprises an elongate longitudinal curved convex spring plate oriented with a convex side directed outwardly away from a longitudinal internal surface 41 of section 27. That is, when section 27 is folded about hinge line 30, to be operationally directed against section 26, FIG. 5, the convex surface 44 of spring plate 40 is directed toward a selected portion of section 26.

It will be understood that the overall curved shape of spring plate 40 provides a biasing means to any appropriately sized member(s) trapped between section 26 and surface 44, during closure, FIG. 5. That is, due to the curvature of surface 44, plate 40 can bias or spring somewhat. Preferably, plate 40 is formed from a moderately flexible plastic or the like, such as a polyvinyl chloride or polypropylene about 20 to 40 mils (0.5–1.0 mm) thick. Also, preferably, plate 44 is formed integral with section 27, for example as indicated along section 48. In general, plate 40 extends longitudinally with, and substantially parallel to, inner surface 41 of section 27. In this manner, a convenient, unitary, construction is provided. It will be understood that the entire arrangement illustrated in FIG. 3 could be formed, as a single piece, from a variety of plastic materials using conventional techniques.

Still referring to FIG. 3, section 26 includes an inner longitudinal surface 50, an outer edge 51 and catch or clasping means preferably comprising lip 52. When device 25 is closed, i.e. when sections 26 and 27 are folded toward one another about hinge line 30, FIG. 5, catch member 38 of section 27 is oriented to engage lip 52, of section 26, in a manner generally retaining device 25 closed. This is indicated generally at 55, FIG. 5. Also, generally internal surface 41 is directed toward internal surface 50 when the device 25 is closed; i.e. in operation the two surfaces 41 and 50 are opposed. It is noted that the biasing means, for preferred embodiments, will generally induce internal pressures operating against catch members 38 and 52, due to material being trapped between surfaces 41 and 50, in a manner helping to retain arrangement 25 closed.

Preferably, interior surface 50, FIG. 3, is concave, generally with an orientation and amount of curvature analogous to that for surface 44, of plate 40. That is, surface 50 is spaced a relatively constant amount from surface 44. The curved surface 50 helps retain and direct sealant, described below, in a preferred orientation between portions of the device 25. In preferred embodiments surface 50 does not exactly match surface 44; and preferably surface 50 has a slightly greater radius of curvature, to facilitate fluid flow as the biasing plate 40 collapses.

Referring still to FIG. 3, it is noted that surface 41 is relatively flat, thus providing for a gap 57 between spring plate 40 and section 27. Gap 57 generally permits spring plate 40 to flare out somewhat, under compressive force.

Operation of closure 25 will be understood by reference to FIGS. 4 and 5. Referring in particular to FIG. 4, closure 25 is shown in an "open" orientation for installation; whereas in FIG. 5, closure 25 is depicted in a "closed" or "shut" orientation, during use, providing an environmental seal; i.e., defining an internal junction-receiving chamber. By the term "open orientation", variants thereof and similar terms, it is meant that the closure 25 is oriented in a manner with sections 26 and 27 not positioned facing and engaging one another, to enclose an article therebetween. On the other hand, by the term "closed orientation", variants thereof and similar terms, it is meant that closure 25 is oriented as it would be about an article trapped therein; that is with sections 26 and 27 facing and engaging one another.

Referring to FIG. 4, closure 25 is depicted with viscous sealant 60 operationally positioned thereon, and with electrical junction 61 operationally positioned in orientation for closure therein. Junction 61 is generally analogous to junction 1, FIG. 1, and is intended to merely represent general orientation of a junction to be enclosed within closure 25. That is, for example, while junction 61 involves four wires, two adjacent wires from each of substantially opposite directions, a variety of arrangements may be utilized. Generally, the item to be sealed should be positioned such that all exposed conductant is overlapped by sealing material.

For the embodiment shown, viscous sealant 60 is divided into first and second pads 63 and 64. Pad 63 generally lines inner surface 50, of section 26. Pad 64, on the other hand, generally lines surface 44 of spring plate 40. In operation, junction 61 is placed in a manner such that when closure 25 is closed, sealant pads 63 and 64 are forced toward one another, i.e. oppose one another, engulfing the junction 61 therein. Under pressure, the pads 63 and 64 of sealant 60 will generally knit, and, again, generally fully engulf section 61 to provide an environmental seal therearound. Formation and retention of the environmental seal is facilitated by spring pressure provided as a result of biasing plate 40. Further, preferred movement of sealant 60 under pressure, to insure appropriate engulfing, is facilitated by curved surface 50.

It will be understood that if a sufficiently viscous sealant is selected for sealant pads 63 and 64, then substantial leakage outwardly from ends 67 and 68 will be unlikely. Continual pressure to maintain a good seal, is provided by biasing plate 40 and clamping line 55, FIG. 5.

In general, FIG. 5, even when a relatively highly viscous sealant material 60 is used, spaces, such as spaces 71 and 72 between adjacent wires, are well sealed, provided at most only about two or three adjacent wires extend out of either end, 67 or 68, of closure 25. However, if substantially more than about two or three wires are involved projecting out of one or the other of the ends, 67 or 68, then a highly viscous sealant 60 may sometimes not adequately flow between adjacent wires, to ensure a good seal, especially under typical operating pressures. It will be understood, however, that if sealant pad 63 and 64 were formed from a relatively low viscosity sealant which could readily flow into spaces between wires, a considerable amount of sealant, under pressure, would also tend to be squeezed outwardly from ends 67 and 68. That is, the sealant would at least partially flow outwardly from closure 25, rather than be forced into forming a good seal between adjacent wires and at ends of the closure 25. A method of sealing to accommodate this problem, is illustrated in the embodiments shown in FIGS. 6, 7 and 8. It will be understood from these descriptions, that the method suggested by FIGS. 4 and 5 is preferred for arrangements utilizing a relatively low number of wires, since it involves a simpler application of sealant.

It is noted that the methods suggested by FIGS. 4 and 5 could readily be practiced on other types of electrical components including a pig-tail splice, such as that shown in FIG. 2. That is, pig-tail splice 15 could be approximately centered in device 25, with sides 26 and 27 being folded thereover. The viscous sealant of pads 63 and 64 would, under pressure, generally be caused to knit and thereby engulf the pig-tail splice 15. Since only two wires 17 and 18 are involved for the example shown, even a relatively highly viscous sealant could generally be readily forced into space 21, providing for a good seal.

For commercial embodiments, certain other features to closures such as closure 25 may be significant and desirable. In some instances, it may be desirable to provide closure 25, for use, in a combination with sealant 60 pre-positioned thereon. That is, closure 25 would be sold with sealant 60 positioned thereon, for use when necessary. Since long storage times might be involved, and it would be desirable to prevent sticky surfaces of sealant 60 from being exposed, for such commercial embodiments it may generally be desirable to provide a removable slip cover or the like, over sections 63 and 64 during use. While such slip covers are not shown in the drawings, it will be understood that they could generally be a sheet of material or the like which could be easily stripped from surfaces 63 and 64, just prior to use of the combination. Slip covers are known in a variety of fields and applications, for use with sticky substances.

It is foreseen that many splices for which enclosures such as enclosure 25 would be used, for example in the automotive, marine and portable power plant industries, involve about 2 to 20 wires, each insulated with a polyvinyl insulation, or similar insulation, and each having a gauge of about 22 to 10. Generally, to accommodate a wide variety of such structures, preferred commercial embodiments of closure 25 would have dimensions of about 0.7 inch wide by 2.0 inches long (1.8 cm by 5.1 cm), with each recess being about 0.1–0.2 inches (0.25–0.51 cm) deep at its deepest point. For such an embodiment, the biasing plate would preferably be about 2.0 inches long by 0.5 inches wide (5.1 cm by 1.27 cm, with a radius of curvature of about 0.2–0.4 inches (0.51–1.02 cm). The radius of the curvature of the "matching" concave shell section, i.e. section 26, FIG. 3, would preferably be a little larger, generally about 0.3–0.5 inches (0.76–1.27 cm). A slightly larger radius of curvature for the concave shell section relative to the biasing plate facilitates sealant flow and wire spreading. Generally, for typical junctions, sealant pads 63 and 64 should be about 0.04–0.08 inches (0.1–0.2 cm) deep; such a depth generally ensuring sufficient sealant material for the typical applications.

It will be understood that the comments of the previous paragraph relate generally to preferred commercial embodiments, that is the production of a closure having a substantially wide, if not universal, application. The dimensions etc. as related herein, however, are exemplary only for certain applications and are not to be interpreted as limiting with respect to obtaining many of the broad advantages of devices as disclosed herein.

The Embodiment of FIGS. 6, 7 and 8

In FIG. 6, closure 125 is shown adapted for use with multi-wire junctions. Except for the nature of the orientation of the viscous sealant material, closure 125 may be generally identical to closure 25, FIG. 3. That is, closure 125 includes section or shell 126 and section or shell 127, joined to one another along hinge 130. Further, section 127 comprises a shell-half 132 having: a longitudinal interior 133; an exterior surface 134, FIG. 7; an elongate outer edge 137 with a catch member 138; and, a spring plate 140 with a convex surface 144. Also, section 126 includes: a curved inner surface 150; an outer edge 151; and, a clasp or closure lip 152. Generally, curved surface 150 is oriented in a manner such as to be opposed by an inner surface 153 of section 127, during operation. This also involves positioning of spring plate 140 substantially longitudinally with, and substantially parallel to, the inner surface 153 of section 127.

Still referring to FIG. 6, closure 125, while substantially identical to closure 25, is shown specifically adapted for use in association with junctions involving a relatively large number of wires. In particular, and referring to FIG. 6, closure 125 is shown open and having a junction 160 illustrated in operational orientation with respect thereto. Junction 160 comprises a five-wire arrangement, a pair of adjacent wires 162 and 163 entering junction 160 substantially adjacent one another and from a first direction; and, three wires, 165, 166 and 167 entering junction 160 from a generally opposite direction, but substantially adjacent or parallel to one another. The arrangement of FIG. 6 facilitates sealing between wires, even when a plurality of wires, such as wires 165, 166 and 167, enter the junction 160 from one direction and adjacent one another.

In particular, the arrangement of FIG. 6 is adapted to facilitate use in association with a relatively low viscosity sealant material, that can be relatively easily squeezed into spaces 169 and 170, between adjacent wires 165, 166 and 167. In particular, and still referring to FIG. 6, each of sections 126 and 127 is provided with a centrally located field, fields 179 and 180 respectively, of relatively low viscosity sealant material. The low viscosity material of sections 179 and 180 can be readily forced, under operating pressures during closure, FIG. 7, into cracks, crevices or spaces between the plurality of wires represented by wires 165, 166 and 167.

Because sections 179 and 180 are of relatively low viscosity material, they generally should be positively contained within structure 125, or they will tend to flow outwardly from opposite ends 190 and 191 thereof, under pressure resulting during closure, FIG. 7. Referring to FIG. 6, each of sections 179 and 180 is bounded or bordered along opposite ends thereof by pads of material, in particular pads 194, 195, 196 and 197 of relatively high viscosity sealant material. Pads 194, 195, 196 and 197 generally act to contain the relatively low viscosity sealant material within structure 125. They also facilitate sealing along outer edges. Material used for pads 194, 195, 196 and 197 may be of a viscosity substantially similar to that used for the embodiment described with respect to FIGS. 3, 4, and 5. That is, it is preferably sufficiently viscous so that it does not readily flow outwardly from an enclosed device under operating pressures, but it is preferably still sufficiently flowable to move, under pressure, between several wires, and to knit with an opposed pad.

For typical commercial embodiments such as those previously described, the arrangement of FIG. 6 generally should be such that sealant pads 179 and 180 are at least about 1.2 inches long by 0.7 inches wide (3.0 cm by 1.8 cm), and 0.04–0.08 inches (0.1–0.2 cm) thick; and end pads 194, 195, 196 and 197 should be at least as thick as pads 179 and 180. Typical end pads will be about 0.3 inches by 0.7 inches (0.1 cm by 1.8 cm). It will be understood, however, that these dimensions are not be interpreted as limiting, but rather as an indication of general dimensions which lead to a widely utilizable closure arrangement.

For the biasing means, a wide variety of biasing pressures may be acceptable, depending in part on the size, depth, and viscosity of the sealant material(s) involved. Generally a spring pressure of about 4–8 lbs/in (0.7–1.4 N/mm) across each linear inch, i.e. length, of closure is sufficient, for commercial embodiments as described.

In FIG. 8, closure arrangement 125 is shown enclosing a pig-tail splice 200 formed from four wires 201, 202, 203 and 204. It will be understood that the junction 206, of pig-tail splice 200 is generally positioned in relatively soft, low viscosity, sealant material. Further, the relatively soft material is bounded at opposite ends by relatively high viscosity sealant material indicated at pads 206 and 207. That is, the arrangement of FIG. 8 is generally analogous to that of FIG. 6, but for the pig-tail splice 200. The low viscosity material, under operating pressure provided by the biasing plate 140, is generally squeezed into places between the multiple adjacent wires 201, 202, 203 and 204. The high viscosity sealant material at the ends, on the other hand, contains the low viscosity material from flowing outwardly from the clamshell structure. Further, it knits to seal the ends of the closure.

For the application of FIGS. 6 and 7, generally the low viscous sealant pads 179 and 180 are shown bonded only at the ends 194, 195, 196 and 197, by the high viscosity material. In some applications, not shown, it may be desirable to have the low viscosity fields 179 and 180 be positioned within the center of a three- or four-sided boarder of relatively high viscosity material. It is to be understood that a variety of bordering arrangements of high viscosity material are to be considered within the scope of the present invention.

In some instances advantages may be obtained using multi-sealant fields with border sections in the absence of the biasing means or plate. That is, the sealant would, for example, be placed directly on surface 153. For this, typically deeper sealant, for example about 0.14 inches (0.35 cm) would be preferred. While the biasing plate is preferred, to ensure proper, directed, sealant flow; some sealing effect would be obtained just from the pressure of closing the two shell sections together.

Figure 9:
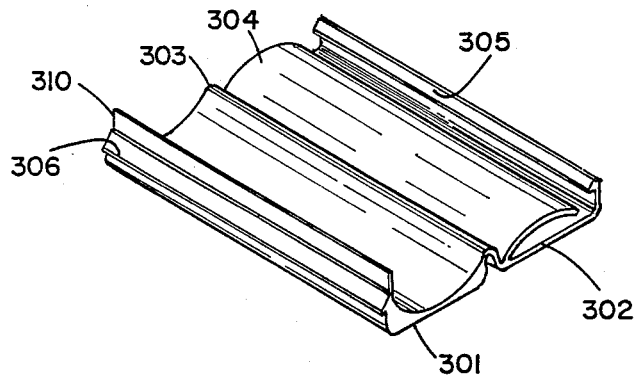
FIG. 9 is a perspective view of an alternate embodiment of a closure according to the present invention, depicted with an optional sealing tongue thereon.

The Alternate Embodiment of FIG. 9

In FIG. 9, a modification to the arrangement shown in FIG. 3 is depicted. In general, the embodiment of FIG. 9 is substantially identical to that of FIG. 3, except as described. That is, the arrangement 300 of FIG. 9 includes the first shell 301, second shell 302, hinge line 303, biasing plate 304 and clasp means indicated by lips 305 and 306. The arrangement 300 also includes a flexible sealing flap or tongue 310 along a portion of section 301. This flexible tongue will generally help to retain sealant material within the enclosure, during use. The flexible nature of tongue 310 is such that when closure arrangement 300 is closed, tongue 310 will tend to fold in along an engaged portion of section 302.

Methods of Providing An Environmental Seal About a Wire Splice or Junction

For the above descriptions, methods of providing environmental seals about wire junctions or like will be understood. In general, the preferred method involves provision of closure having biasing means therein oriented to provide internal pressure against sealant material or the like, positioned within the enclosure. Sealant material of appropriate viscosity, then, may be used to provide an environmental seal, by positioning the sealant material along with the junction to be sealed, within the closure. Preferred means for directing the sealant material comprise utilization of a curved biasing plate, and mated recess area. In some applications composite fields of viscous material, including at least two fields of different viscosity, may be used in preferred manners, to achieve desired results. In particular, positioning a junction involving a multiplicity of wires in a field of relatively low viscosity sealant material, facilitates movement of sealant material into spaces between adjacent wires. On the other hand, such relatively low viscosity sealant material should, typically, be appropriately bordered by a higher viscosity material, to inhibit substantial leakage outwardly from the closure system.

The Sealant Material(s)

The higher viscosity material

A variety of sealant materials may be utilized in combination with arrangements according to and during applications of the present invention as the sealant of the embodiments of FIG. 4, or as the higher viscosity sealant of the embodiment of FIG. 6. Generally, what is required of such sealants is that they: exhibit sufficient adhesion to substrate wire insulations to provide a good seal, typically at least 200.0 oz./inch width, or about 2.2 N/mm is obtainable and more than sufficient; exhibit a sufficiently high insulation resistance, for example about $1 \times 10^6$ megohms is obtainable and more than sufficient; exhibit sufficiently low water absorption, for example on the order of 0.75% is obtainable and effective; and, exhibit good adherence to metals from which wire connections may be made, for example an adherence of about the same as the above-related adherence to substrate wire insulation is generally more than sufficient. For "higher" viscosity sealants utilized as above described, generally a cone penetration value, according to ASTM D-217, within the range of about 45-70 (4.5 to 7.0 mm, units of cone penetration are 0.1 mm), at 25° C. is sufficient for most typical applications. With such cone penetration values, materials used as the higher viscosity sealant generally exhibit desirable flow and sealing characteristics under typical pressures and temperatures for typical applications of closures according to the present invention. Preferably the cone penetration value is no greater than about 70° at 25° C., or the substance may too easily flow for universal application.

Adhesives or sealants usable include thick, rubber-based, compounds. Preferred sealants generally comprise soft, tackified, elastomer compounds extended with oils and fillers. Typical, usable, elastomer bases for such compositions including polyisobutylenes/EPDM rubber/butyl rubber mixtures. Such sealants do not readily degrade when exposed to automotive or marine environments. Further, they are not substantially adversely affected by severe vibration or extreme temperature change.

One usable sealant material comprises a mixture of the following materials, blended to a viscosity of 2650 to 3350 poise, at a shear rate of 1/600 sec. and a temperature of 75° C.

| Material | Amount, PHR* |
|---|---|
| Polyisobutylene | 40.0 |
| EPDM rubber | 28.8 |
| Butyl rubber | 31.2 |
| Polybutene | 100.0 |
| Inorganic filler | 150.1 |
| Asphalt | 30.0 |
| Carbon black | 15.0 |
| Hydrocarbon tackifier | 50.0 |

*PHR = parts per hundred Rubber Component. The term "Rubber Component" is meant to refer to the total of the polyisobutylene, EPDM rubber and butyl rubber components.

The lower viscosity material

Generally, strength of adhesion between the lower viscosity material, FIG. 6, and the junction and/or wire insulation is less important than for the higher viscosity material. However, it is preferred that the material readily coat or wet the junction and/or insulation so that a water impermeable arrangement is effected. Typical substances usable as the lower viscosity material comprise grease-like compositions such as: Lubrizol 2358, Lubrizol, Corp., Wickliffe, Ohio 44092 a hydrocarbon-based grease; and, Dow Corning High Vacuum Grease, a silicone-based grease. Generally, greases having cone penetration of about 180 to 330 at 25° C. are preferred. Preferably the cone penetration value is at least about 180, or the substance may not sufficiently flow, for near universal application. Insulation resistance and water absorption characteristics at least on the order of those of the higher viscosity material are preferred.

It is to be understood that while certain embodiments of the present invention have been illustrated and described, it is not to be limited to the specific forms, arrangement of parts, or methods herein described and shown.

What is claimed and desired to be secured by Letters Patent is as follows:

1. A closure and sealant combination for use in providing an environmental seal about a wire junction or the like; said combination comprising:
   (a) an openable shell having first and second elongate shell sections oriented adjacent one another, along a hinge; said first and second shell sections being selectively movable about said hinge between open and closed orientations; said shell, when in said closed orientation, defining an elongate, longitudinal, internal junction-receiving chamber having first and second, opposite, open end portions;
      (i) said second shell section having a second longitudinal surface; and,
      (ii) said first shell section having a first longitudinal surface; said first and second surfaces, when said shell is in said closed orientation, being positioned substantially opposed to one another;
   (b) an internal biasing mechanism comprising an elongate, longitudinal, convex spring plate oriented with a convex side thereof projecting generally outwardly from said second shell section second longitudinal surface; said spring plate extending between said chamber first and second opposite end portions;
   (c) clasp means constructed and arranged to selectively retain said shell in said closed orientation; and,
   (d) viscous sealant material disposed within said shell; said sealant material being oriented in first and second, opposed, sealant fields;
      (i) said first sealant field being positioned on said convex spring plate convex side; and, (ii) said first sealant field being positioned on said second shell section longitudinal surface;

(e) whereby in use a junction can be engulfed within between viscous sealant first and first fields in a closed shell, and between said spring plate and said second shell section, thereby generating an environmental seal around said junction.

2. A combination according to claim 1 wherein:
(a) said first longitudinal surface includes an elongate, longitudinal, concave trough therein aligned longitudinally with, and substantially parallel to, said longitudinal convex spring plate.

3. A combination according to claim 2 wherein:
(a) said viscous sealant material has a cone penetration value of no greater than about 70° at 25° C.

4. A combination according to claim 1 wherein:
(a) said viscous sealant material has a cone penetration value of no greater than about 70° at 25° C.

5. A combination according to claim 1 wherein:
(a) said first sealant field has first and second end portions; and, said second sealant field has first and second end portions; said first and second sealant fields comprising a first viscous sealant having a first viscosity; and,
(b) said combination includes second sealant border portions oriented along end portions of said first and second sealant fields to substantially inhibit flow of said first viscous sealant outwardly from said shell; said second sealant border portions comprising flowable sealant material having a second viscosity; said first viscosity being lower than said second viscosity.

6. A combination according to claim 6 wherein:
(a) said first viscous sealant has a cone penetration value of at least about 180° at 25° C.; and,
(b) said second sealant material has a cone penetration value of no greater than about 70° at 25° C.

7. A combination according to claim 6 wherein:
(a) said first longitudinal surface includes an elongate, longitudinal, concave trough therein aligned longitudinally with, and substantially parallel to, said longitudinal convex spring plate.

8. A combination according to claim 5 wherein:
(a) said first longitudinal surface includes an elongate, longitudinal, concave trough therein aligned longitudinally with, and substantially parallel to, said longitudinal convex spring plate.

9. A closure and sealant combination for use in providing an environmental seal about a wire junction or the like; said combination comprising:
(a) an openable shell having first and second elongate shell sections oriented adjacent one another, along a hinge; said first and second shell sections being selectively movable about said hinge between open and closed orientations; said shell, when in said closed orientation, defining an elongate, longitudinal, internal junction-receiving chamber having first and second, opposite, open end portions;
   (i) said first shell section having a first longitudinal surface; and,
   (ii) said second shell section having a second longitudinal surface; said first and second surfaces, when said shell is in said closed orientation, being positioned substantially opposed to one another;
(b) clasp means constructed and arranged to selectively retain said shell in said closed orientation; and,
(c) viscous sealant material disposed within said shell; said sealant material being oriented in first and second, opposed, sealant fields;
   (i) said first sealant field being positioned on said first section longitudinal surface; said first sealant field having first and second end portions;
   (ii) said second sealant field being positioned on said second shell section longitudinal surface; said second sealant field having first and second end portions;
   (iii) said first and second sealant fields comprising a first viscous sealant having a first viscosity; and,
   (iv) said combination including second sealant border portions oriented along end portions of said first and second sealant fields to substantially inhibit flow of said first viscous sealant outwardly from said shell; said second sealant border portions comprising flowable sealant material having a second viscosity; said first viscosity being lower than said second viscosity; and
(d) whereby in use a junction can be engulfed within between viscous sealant first and second fields in a closed shell, thereby generating an environmental seal around said junction.

10. A combination according to claim 9 wherein:
(a) said first viscous sealant has a cone penetration value of at least about 180° at 25° C.; and,
(b) said second sealant material has a cone penetration value of no greater than about 70° at 25° C.

11. A method of providing an environmental seal about a wire junction or the like; said method comprising the steps of:
(a) providing a closure comprising:
   (i) an openable shell defining, when closed, an internal junction-receiving chamber; said shell having at least first and second substantially opposed internal surfaces and means for extension of wires from an enclosed wire junction outwardly from said shell, during use;
   (ii) an internal biasing mechanism positioned within said closure when closed and constructed and arranged to apply pressure against sealant material, when the sealant material is operably received in said junction-receiving chamber, generally along a direction between said first and second internal surfaces; said biasing mechanism comprising an elongate, longitudinal, convex spring plate having a convex surface oriented to project outwardly away from said second surface and toward said first surface, when said shell is closed;
(b) providing a first field of viscous sealant material on said spring plate convex surface;
(c) providing a second field of viscous sealant material on said first internal surface;
(d) closing said shell about a junction in a manner engulfing the junction in said viscous sealant; and,
(e) retaining said shell closed about the junction.

12. A method according to claim 11 wherein said step of providing a closure with a convex spring plate includes providing a closure wherein said convex spring plate is integral with said openable shell.

13. The method according to claim 11 wherein:
(a) said viscous sealant material has a cone penetration value of no greater than about 70° at 25° C.

14. The method according to claim 11 wherein:
(a) said first internal surface includes a elongate, longitudinal, concave trough therein aligned longitudinally with, and substantially parallel to, said longitudinal convex spring plate; and, (b) said viscous sealant material has a cone penetration value of no greater than about 70° at 25° C.

15. A method according to claim 11 wherein:

(a) said first field of viscous sealant material has first and second end portions;

(b) said second field of viscous sealant material has first and second end portions; and, (c) said method includes a step of providing border portions of viscous sealant material around said first and second field end portions, to inhibit flow of said viscous sealant from said first and second fields along and outwardly from said end portions;

(i) viscous sealant material in said first and second fields having a cone penetration value of at least about 180° at 25° C.; and (ii) viscous sealant material of said border portions has a cone penetration value of no greater than about 70° at 25° C.

16. A closure and sealant combination for use in providing an environmental seal about a wire junction or the like; said combination comprising:

(a) a shell having first and second shell sections; said shell sections being positionable to define open and closed orientations of said shell; said shell, when in said closed orientation, defining an internal junction-receiving chamber;

(i) said second shell section having a second longitudinal surface; and, (ii) said first shell section having a first longitudinal surface; said first and second surfaces, when said shell is in said closed orientation, being positioned substantially opposed to one another;

(b) an internal biasing mechanism positioned, in use, within said shell and comprising an elongate, longitudinal, convex spring plate oriented with a convex side thereof projecting generally outwardly away from said second shell section second longitudinal surface;

(c) clasp means constructed and arranged to selectively retain said shell in said closed orientation and, (d) viscous sealant material disposed within said shell; said sealant material being oriented in first and second, opposed, sealant field;

(i) said first sealant field being positioned on said convex spring plate convex side; and, (ii) said second sealant field being positioned on said first shell section first longitudinal surface;

(e) whereby in use a junction can be engulfed within and between said viscous sealant first and second fields in said shell when closed, and between said spring plate and said first shell section, thereby generating an environmental seal around said junction.

17. A combination according to claim 16 wherein:

(a) said first longitudinal surface includes an elongate, longitudinal, concave trough therein aligned longitudinally with, and substantially parallel to, said longitudinal convex spring plate.

18. A combination according to claim 17 wherein:

(a) said viscous sealant material has a cone penetration value of no greater then about 70° at 25° C.

19. A combination according to claim 16 wherein:

(a) said viscous sealant material has a cone penetration value of no greater than about 70° at 25° C.

20. A combination according to claim 16 wherein:

(a) said first sealant field has first and second end portions; and, said second sealant field has first and second end portions; said first and second sealant fields comprising a first viscous sealant having a first viscosity; and, (b) said combination includes second sealant border portions oriented along end portions of said first and second sealant fields to substantially inhibit flow of said first viscous sealant outwardly from said shell; said second sealant border portions comprising flowable sealant material having a second viscosity; said first viscosity being lower than said second viscosity.

21. A combination according to claim 20 wherein:

(a) said first viscous sealant has a cone penetration value of at least about 180° at 25° C.; and, (b) said second sealant material has a cone penetration value of no greater than about 70° at 25° C.

22. A combination according to claim 21 wherein:

(a) said first longitudinal surface includes an elongate, longitudinal, concave trough therein aligned longitudinally with, and substantially parallel to, said longitudinal convex spring plate.

23. A combination according to claim 20 wherein:

(a) said first longitudinal surface includes an elongate, longitudinal, concave trough therein aligned longitudinally with, and substantially parallel to, said longitudinal convex spring plate.

24. A closure and sealant combination for use in providing an environmental seal about a wire junction or the like; said combination comprising:

(a) a selectively closeable shell defining, when closed, an internal chamber; said shell having an internal, longitudinal, surface;

(b) an internal biasing mechanism positioned, when said shell is closed, within said internal chamber; said biasing mechanism comprising an elongate, longitudinal, convex spring plate oriented with a convex side thereof projecting toward said internal, longitudinal, surface;

(c) viscous sealant material disposed within said shell and oriented in first and second, opposed, sealant fields;

(i) said first sealant field being positioned on said convex spring plate convex side; and, (ii) said second sealant field being positioned on said internal, longitudinal, surface.

25. A combination according to claim 24 wherein:

(a) said internal, longitudinal, surface includes an elongate, longitudinal, concave trough therein aligned longitudinally with, and substantially parallel to, said longitudinal convex spring plate.

26. A combination according to claim 24 wherein:

(a) said viscous sealant material has a cone penetration value of no greater than about 70° at 25° C.

* * * * *

UNITED STATES PATENT AND TRADEMARK OFFICE
CERTIFICATE OF CORRECTION

PATENT NO. : 4,849,580
DATED : July 18, 1989
INVENTOR(S) : Donald F. Reuter

It is certified that error appears in the above-indentified patent and that said Letters Patent is hereby corrected as shown below:

Column 15, Line 33, "Claim 6" should read--Claim 5--.

Column 16, Line 67, "a" should read --an--.

Column 17, Lines 4 and 20 Change "70°" to --70--; and
Line 17, change "180°" to --180--.

Column 18, Lines 2,5, 24 and 61, Change "70°" to --70--; and
line 22 change "180°" to --180--.

Signed and Sealed this

Tenth Day of January, 1995

Attest:

BRUCE LEHMAN

Attesting Officer    Commissioner of Patents and Trademarks